United States Patent
Sugihara et al.

(10) Patent No.: US 7,302,188 B2
(45) Date of Patent: Nov. 27, 2007

(54) DISPERSE EQUALIZER AND DISPERSE EQUALIZING METHOD

(75) Inventors: Takashi Sugihara, Tokyo (JP); Takashi Mizuochi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 636 days.

(21) Appl. No.: 10/471,368

(22) PCT Filed: Jan. 27, 2003

(86) PCT No.: PCT/JP03/00728

§ 371 (c)(1),
(2), (4) Date: Sep. 11, 2003

(87) PCT Pub. No.: WO03/065622

PCT Pub. Date: Aug. 7, 2003

(65) Prior Publication Data

US 2004/0114936 A1 Jun. 17, 2004

(30) Foreign Application Priority Data

Jan. 30, 2002 (JP) ............................. 2002-022452

(51) Int. Cl.
*H04B 10/12* (2006.01)
(52) U.S. Cl. ........................................ 398/147; 398/29
(58) Field of Classification Search ........ 398/147–150, 398/81, 159, 152, 29, 158
See application file for complete search history.

(56) References Cited

U.S. PATENT DOCUMENTS

| 6,148,423 | A | 11/2000 | Le Mouel et al. |
| 6,292,603 | B1 | 9/2001 | Mizuochi et al. |
| 6,334,219 | B1 * | 12/2001 | Hill et al. .................... 725/106 |
| 6,396,606 | B1 * | 5/2002 | Mao ........................... 398/152 |
| 6,487,686 | B1 * | 11/2002 | Yamazaki et al. .......... 714/703 |
| 6,871,024 | B2 * | 3/2005 | Nishimoto et al. ......... 398/159 |
| 2001/0046077 | A1 | 11/2001 | Akiyama et al. |
| 2003/0081596 | A1 * | 5/2003 | Kikidis et al. .............. 370/356 |

FOREIGN PATENT DOCUMENTS

| EP | 0 580 497 A1 | 1/1994 |
| EP | 0 944 191 A1 | 9/1999 |
| EP | 1 158 703 A2 | 11/2001 |
| JP | 7-221705 A | 8/1995 |
| JP | 8-321805 A | 12/1996 |
| JP | 9-326755 A | 12/1997 |

(Continued)

*Primary Examiner*—Christina Leung
(74) *Attorney, Agent, or Firm*—Birch, Stewart, Kolasch & Birch, LLP (57) ABSTRACT

If no alarm is input from an optical receiver, an FEC decoder, or a client signal monitor, a control circuit controls a variable dispersion equalizer such that a transmission error becomes smaller using information on the number of error corrections obtained from the FEC decoder and fixes a dispersion equalization value in the event that the error becomes equal to or lower than a specified value. If the alarm information is input, the control circuit switches control over the variable dispersion equalizer from an ordinary control to a search mode control for searching an optimal dispersion equalization value in a wide range to thereby search the optimal dispersion equalization value at a higher speed.

24 Claims, 6 Drawing Sheets

FOREIGN PATENT DOCUMENTS

| | | |
|---|---|---|
| JP | 11-68657 A | 3/1999 |
| JP | 11-266200 A | 9/1999 |
| JP | 11-331132 A | 11/1999 |
| JP | 2001-77756 A | 3/2001 |
| JP | 2001-230728 A | 8/2001 |
| JP | 2001-339345 A | 12/2001 |
| JP | 2001-339347 A | 12/2001 |
| JP | 2002-9699 A | 1/2002 |
| JP | 2002-22452 | 1/2002 |

\* cited by examiner

DISPERSE EQUALIZER AND DISPERSE EQUALIZING METHOD

This application is the national phase under 35 U.S.C. § 371 of PCT International Application No. PCT/JP03/00728 which has an International filing date of Jan. 27, 2003, which designated the United States of America.

TECHNICAL FIELD

This invention relates to a method of and an apparatus for dispersion equalization.

BACKGROUND ART

Chromatic dispersion on an optical fiber transmission line temporally fluctuates with the external temperature, stress or the like. In an ultra high speed optical transmission system, the power to withstand of an optical signal transmitted on the optical fiber transmission line against the chromatic dispersion lowers considerably. Therefore, the quality of the transmitted signal degrades even if there is a slight fluctuation in the chromatic dispersion. It is, therefore, necessary to appropriately the equalize dispersion arising due to the fluctuation in the chromatic dispersion on the optical fiber transmission line. One approach to compensate for the temporal fluctuation of chromatic dispersion arising is the automatic dispersion equalization technique. In order to construct an ultra high speed optical transmission system that uses the automatic dispersion equalization technique, it is essential to establish a control method that can be easily implemented.

As the automatic dispersion equalization technique, a control method based on the magnitude of the extracted clock component of a received optical signal is disclosed in Japanese Patent Application Laid-Open No. 11-68657 (Method and system for controlling chromatic dispersion and a method for detecting amount of dispersion), for example. Moreover, methods for controlling a variable dispersion equalizer based on the result of monitoring the errors of a transmitted optical signal are disclosed in Japanese Patent Application Laid-Open Nos. 9-326755 (Automatic equalizing system) and 2001-77756 (Optical fiber communication system incorporating automatic dispersion compensation module for compensating variation of dispersion caused by temperature).

However, the control method disclosed in Japanese Patent Application Laid-Open No. 11-68657 has a disadvantage in that control differs according to waveforms or degrees of chirping of signals to be used.

For example, if a chirp-free NRZ (Non-Return-to-Zero) optical signal is linearly transmitted, an optimum point is obtained when the magnitude of a clock component becomes a minimum. If a chirp-free RZ (Return-to-Zero) optical signal is linearly transmitted, an optimum point is obtained when the magnitude of the clock component becomes a maximum. In addition, if frequency chirp occurs to the signal waveform of, for example, an NRZ signal, then an optimum point is not necessarily obtained when the magnitude of the clock component becomes a minimum.

Thus, in controlling the variable dispersion equalizer by clock extraction, a control method need to be changed according to transmission conditions, and therefore, this approach is not a versatile approach. In addition, in the method for monitoring the degradation of signal quality due to different factors, e.g., the method for monitoring the magnitude of the extracted clock component, generally requires preparation of different monitors for the respective factors of the degradation of the signal quality. Therefore, the configuration of the apparatus becomes complicated.

In the method disclosed in Japanese Patent Application Laid-Open Nos. 9-326755 and 2001-77756, by contrast, optimum control can be ensured irrespective of factors for the degradation of signal quality and transmission conditions by controlling the variable dispersion equalizer so that transmission errors finally become a minimum.

If the controlling of the variable dispersion equalizer using a transmission error monitor is actually applied to an optical communication terminal station, the following problems should be taken into account. It is necessary that the receiving terminal can identify a transmitted optical signal in order to monitor transmission errors and control the variable dispersion equalizer based on an error state. In addition, a state in which errors can be accurately counted is essential. For instance, in an terminal station constituted to transmit an optical signal using an error-correction code, if no optical signal is input to an optical receiver, the out-of-frame synchronism for the structure of frames encoded by the error-correction code and error correction and error detection functions cannot be, therefore, fulfilled, or if the error number detection function of the error-correction code cannot be used because errors exceeding the error-correcting capability of the code occur, then the variable dispersion equalizer cannot be controlled by monitoring transmission errors. Therefore, to monitor transmission errors and control the variable dispersion equalizer, it is very important that signal quality can be always, accurately monitored.

However, the method for controlling the variable dispersion equalizer as well as the apparatus in a state in which transmission errors cannot be detected is not disclosed in the conventional art, for example, in Japanese Patent Application Laid-Open Nos. 9-326755 and 2001-77756). It is, therefore, necessary to further contrive to incorporate the controlling of the variable dispersion equalizer based on the transmission error monitoring result into the optical communication terminal station.

It is an object of the present invention to solve at least the problems in the conventional technology.

DISCLOSURE OF THE INVENTION

The dispersion equalizer according to one aspect of the present invention includes an error detection unit that detects a transmission error of an optical signal, wherein the optical signal is coded based on an error-correction code and transmitted on an optical fiber transmission line; an alarm detection unit that detects alarm information on transmission of the optical signal; a variable dispersion equalization unit provided at an earlier stage with respect to the error detection unit and the alarm detection unit, wherein variable dispersion equalization unit adjusts a parameter for restricting a transmission length of the optical fiber transmission line based on a control signal; and a control unit that generates the control signal based on the transmission error information obtained from the error detection unit and the alarm information obtained from the alarm detection unit.

The dispersion equalizer according to another aspect of the present invention includes a transmitter that transmits an optical signal to an optical fiber transmission line; and a receiver that receives the optical signal from the optical fiber transmission line. The receiver includes an error detection unit that detects a transmission error of the optical signal, wherein the optical signal is coded based on an error-correction code and transmitted on an optical fiber transmission line; an alarm detection unit that detects alarm information on transmission of the optical signal; and a transmission unit that transmits the detected transmission error information and the detected alarm information to the transmitter. The transmitter includes a variable dispersion equalization unit that adjusts a parameter for restricting a transmission length of the optical fiber transmission line based on a control signal; an information extraction unit that extracts the transmission error information and the alarm information from the optical signal transmitted to the optical fiber transmission line; and a control unit that generates the control signal using the extracted transmission error information and the extracted alarm information.

The dispersion equalization method according to still another aspect of the present invention includes receiving an optical signal, wherein the optical signal is coded based on an error-correction code and transmitted on an optical fiber transmission line; equalizing chromatic dispersion of the optical signal based on a parameter for equalizing the chromatic dispersion of the optical signal; detecting transmission error information on the chromatic dispersion equalized optical signal and detecting alarm information on transmission of the optical signal; generating a control signal based on the transmission error information and the alarm information; and adjusting the parameter based on the control signal.

The dispersion equalization method according to still another aspect of the present invention includes receiving an optical signal transmitted on an optical fiber transmission line; equalizing chromatic dispersion of the optical signal based on the received optical signal and transmitting the chromatic dispersion equalized optical signal to the optical fiber transmission line. The receiving the optical signal includes receiving the optical signal coded by an error-correction code via the optical fiber transmission line; detecting transmission error information on the optical signal; and detecting alarm information on transmission of the optical signal. The equalizing includes generating a control signal based on the transmission error information and the alarm information; adjusting a parameter for equalizing the chromatic dispersion of the optical signal accompanying transmission of the optical signal on the optical fiber transmission line based on the control signal, and equalizing the transmitted optical signal based on the parameter.

BEST MODE FOR CARRYING OUT THE INVENTION

Exemplary embodiments of a dispersion equalizer and a dispersion equalization method according to this invention are explained below in detail with reference to the accompanying drawings.

Figure 1:
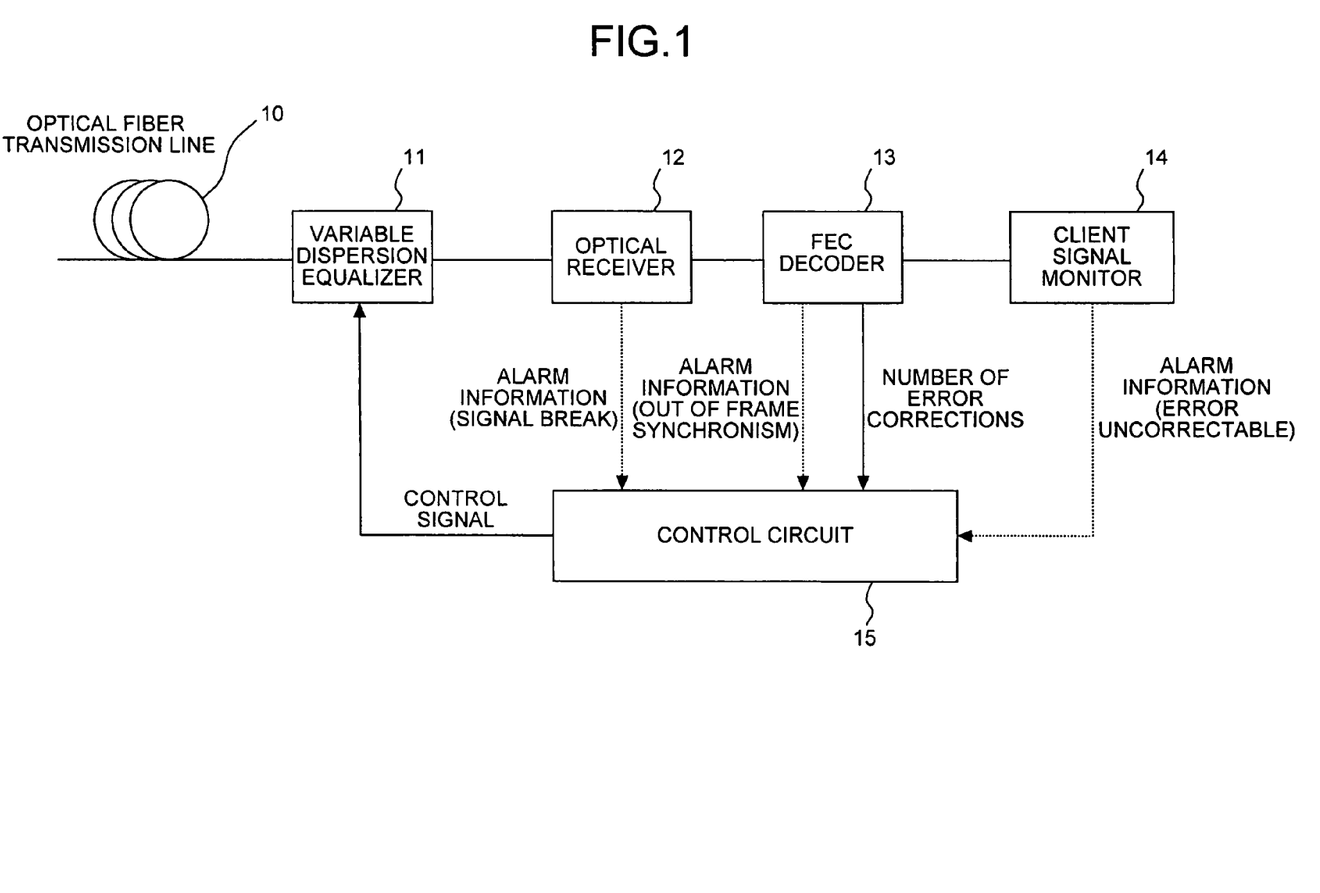
FIG. 1 is a block diagram of a dispersion equalizer according to a first embodiment of this invention.

FIG. 1 is a block diagram of a dispersion equalizer according to a first embodiment of this invention. This dispersion equalizer comprises a variable dispersion equalizer 11 that receives an optical signal via an optical fiber transmission line 10, an optical receiver 12 that receives an output (which is an optical signal) of the variable dispersion equalizer 11, an FEC (Forward Error Correction) decoder 13 that receives an output (which is an electric signal) of the optical receiver 12, a client signal monitor 14 that receives an output (which is an electric signal) of the FEC decoder 13. A control circuit 15 controls the variable dispersion equalizer 11 based on information obtained from the optical receiver 12, the FEC decoder 13, and the client signal monitor 14.

The optical receiver 12 converts the optical signal received from the variable dispersion equalizer 11 into an electric signal, identifies and reproduces the electric signal, and outputs the reproduced frame signal to the FEC decoder 13. If the input of the optical signal to the optical receiver is pauses, the optical receiver 12 outputs alarm information (signal break) to the control circuit 15.

The FEC decoder 13 decomposes the frame signal received from the optical receiver 12, conducts error detection and error correction for a client signal, and outputs the resultant client signal to the client signal monitor 14. At this time, the FEC decoder 13 outputs the number of error corrections (one of transmission error information) counted by the bit error count function thereof to the control circuit 15. The number of error corrections corresponds to the number of errors before the error corrections. If the client signal monitor 14 detects an out-of-frame synchronism, the client signal monitor 14 outputs alarm information, which indicates the out-of-frame synchronism, to the control circuit 15.

The client signal monitor 14 detects the errors of the input client signal using bit interleave parity. The errors detected herein are residual uncorrectable errors after the error corrections of the FEC decoder 13. Upon detection the errors, the client signal monitor 14 outputs alarm information (errors uncorrectable) to the control circuit 15.

The control circuit 15 collects information from the optical receiver 12, the FEC decoder 13, and the client signal monitor 14, and controls the variable dispersion equalizer 11 based on the collected information using a control signal.

The variable dispersion equalizer 11 adjusts parameters for restricting the transmission length of the optical fiber transmission line based on a control signal from the control circuit 15, and equalizes the optical signal. Specifically, the variable dispersion equalizer 11 equalizes the distorted waveform of the optical signal caused by chromatic dispersion by applying inverted characteristic, as compared to that of chromatic dispersion, to the optical signal.

The chromatic dispersion created by the variable dispersion equalizer 11 can be freely changed depending upon the chromatic dispersion on the optical fiber transmission line 10. As a result, even if the chromatic dispersion on the optical fiber transmission line 10 changes due to changes in stress, temperature or the like, the variable dispersion equalizer 11 can create the best control chromatic dispersion characteristics, thus ensuring optimal dispersion equalization.

The parameters for restricting the transmission length of the optical fiber transmission line adjusted by the variable dispersion equalizer 11 involve, for example, polarization mode dispersion, polarization dependency loss, nonlinear optical, and condition (signal level, extinction ratio, chirp and the like) of the optical signals.

Figure 2:
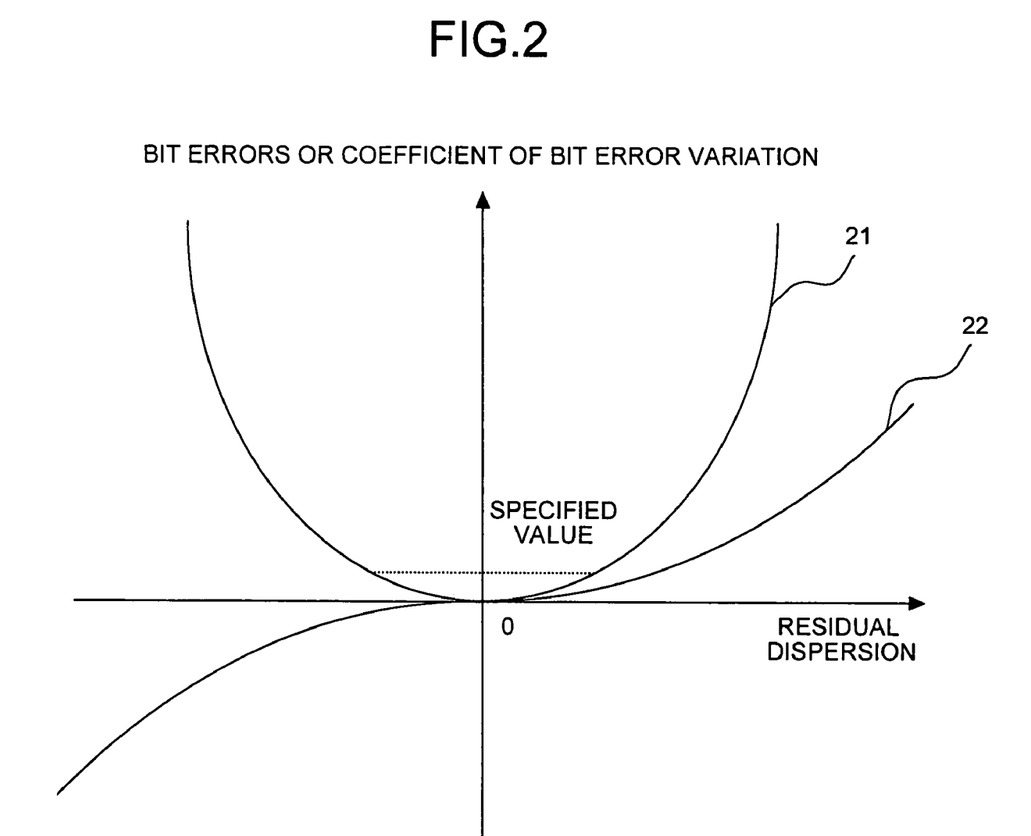
FIG. 2 is a graph of bit errors or coefficient of bit error variation against residual dispersion.
Figure 3:
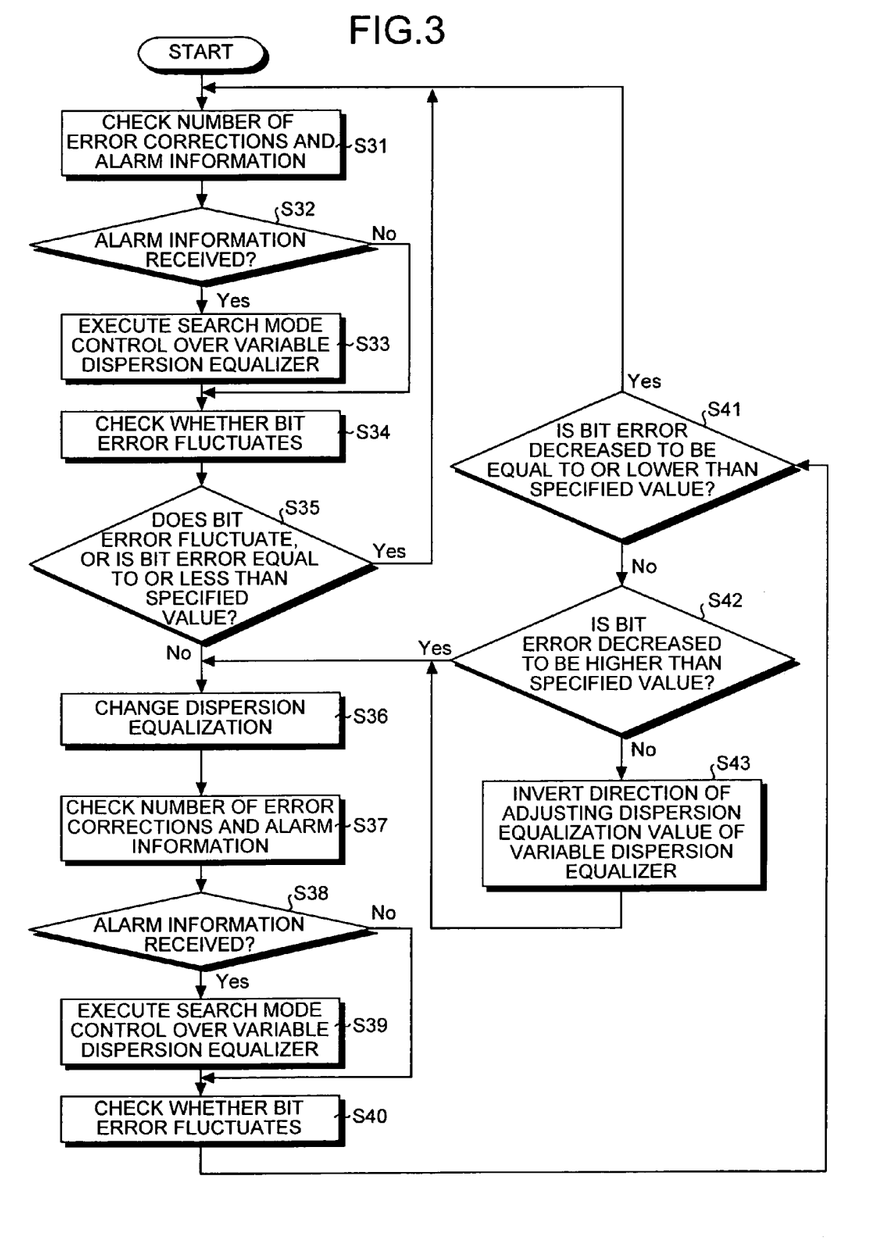
FIG. 3 is a flowchart of a process for controlling the variable dispersion equalizer shown in FIG. 1.

The operation of the dispersion equalizer in the first embodiment is explained with reference to FIGS. 1 to 3. FIG. 2 is a graph of bit errors or coefficient of bit error variation against residual dispersion. FIG. 3 is a flowchart of a method for controlling the variable dispersion equalizer 11.

Referring to FIG. 1, the variable dispersion equalizer 11 receives an FEC coded optical signal via the optical transmission line 10. The variable dispersion equalizer 11 converts the optical signal into an electric signal. The optical receiver 12 receives the electric signal, identifies and reproduces the electric signal, and supplies the electric signal thus identified to the FEC decoder 13. If the optical receiver 12 detects a pause in the optical signal, it outputs the alarm information (signal break) to the control circuit 15. The FEC decoder 13 conducts error detection and error correction, acquires the number of error corrections by the bit error count function, and supplies the acquired number to the control circuit 15. If the client signal monitor 14 detects an error, it outputs the alarm information (errors uncorrectable) to the control circuit 15.

If the control circuit 15 does not receive the alarm information from any of the optical receiver 12, the FEC decoder 13, and the client signal monitor 14, it controls the variable dispersion equalizer 11 such that the transmission errors become fewer using the information on the number of error corrections obtained from the FEC decoder 13. The control circuit 15 then fixes a dispersion equalization value when the errors become equal to or lower than a specified value.

If the control circuit 15 receives the alarm information from at least one of the optical receiver 12, the FEC decoder 13, and the client signal monitor 14, it switches control over the variable dispersion equalizer 11 from ordinary control to search mode control. The search mode control is a method of searching an optimal dispersion equalization value in a wide range, so that an operation for searching the optimum dispersion equalization value can be performed at a higher speed. For example, the search mode control is executed if dispersion on the transmission line fluctuates suddenly, or the dispersion equalization value deviates greatly from the optimum value, or the alarm information (errors uncorrectable) is generated continuously. Likewise, the search mode control is executed if the alarm information (signal break) and alarm information (the out-of-frame synchronism) are generated.

FIG. 2 is a graph of the residual dispersion of a chirp-free optical signal after the signal passes through the variable dispersion equalizer and the coefficients of bit error variation which correspond to the differential of bit errors 21 and 21, respectively. At a point at which the residual dispersion value nears zero and the bit error 22 becomes smaller, bit error variation becomes smaller. Accordingly, it is seen that the variable dispersion equalizer 11 can be optimally controlled by monitoring the fluctuation of the number of error corrections when the number of error corrections and dispersion equalization values acquired within unit time are fluctuated and by controlling the variable dispersion equalizer 11 so that these parameters become minimums.

FIG. 3 is a flowchart of the method for controlling the variable dispersion equalizer 11. Upon booting of the apparatus, the control circuit 15 checks whether the number of error corrections or the alarm information are received (steps S31 and S31). If the alarm information is received ("Yes" at step S32), the control circuit 15 executes search mode control over the variable dispersion equalizer 11, searches at a high speed for an optimum dispersion equalization value in a wide range (step S33). If the equalization value can be searched, i.e., when reception of the alarm information pauses, then a processing at step S34 is carried out. If the control circuit 15 does not receive the alarm information ("No" at step S32), the processing at step S34 is carried out.

At step S34, the control circuit checks whether there is a fluctuation in the bit error. If there is no fluctuation in the bit error or if the bit error is equal to or lower than a specified value ("Yes" at step S35), then the processing at step S31 is repeated. In other words, if the control circuit does not receive the alarm information ("No" at step S32) and if the bit error either does not fluctuate or the fluctuations are negligible ("Yes" at step S35), then the dispersion equalization value of the variable dispersion equalizer 11 is fixed to a set value.

That is, in a small error region in the stationary state in which no alarm information is generated ("No" at step S32), the control circuit 15 performs an operation for fixing the dispersion equalization value to the set value so as not to unnecessarily change the dispersion equalization value of the variable dispersion equalizer 11 and not to thereby increase transmission errors if the bit error becomes equal to or lower than a predetermined threshold or bit error variation reaches a predetermined threshold error variation.

If the bit error is equal to or more than the specified value ("No" at step S35), then the control circuit 15 changes the dispersion equalization of the variable dispersion equalizer 11 (step S36). Moreover, the control circuit 15 checks whether the number of error corrections and the alarm information are received (steps S37 and S38).

If the control circuit 15 does not receive the alarm information ("No" at step S38), it checks whether there is a fluctuation in the bit error (step S40). At step S40, the control circuit 15 determines if the bit error has decreased to a value that is equal to or lower than the specified value or if the bit error has decreased to a value that is higher than the specified value, or if the bit error has increased to a value that is higher than the specified value.

If the bit error has decreased to a value that is equal to or lower than the specified value ("Yes" at step S41), the processing at step S31 is carrier out. Thus, the control circuit 15 performs an operation for maintaining the changed dispersion equalization value. If the result of determination at step S41 is "No", then the control circuit checks whether the bit error has decreased to a value that is higher than the specified value (step S42). If the result of determination at step S42 is "Yes", then the processing at step S36 is carried out. Thus, the control circuit 15 changes the current dispersion equalization. If the result of determination at step S42 is "No", then it means that the bit error has increased and the bit error is higher that the specified value. In this case the control circuit 15 inverts the direction of adjusting the dispersion equalization of the variable dispersion equalizer 11 (step S43) and the processing at step S36 is carried out. That is, the control circuit 15 changes the current dispersion equalization.

In this way, the control circuit 15 increase or decrease the dispersion equalization slightly in such a manner that the transmission errors or the coefficient of transmission error variation decreases in the region in which errors exist in the stationary state in which no alarm information is generated ("No" at step S38).

Through these operations, if the dispersion equalization value greatly deviates from the optimal value and alarm information is consequently generated similarly to an instance in which dispersion on the transmission line greatly fluctuates in short time ("Yes" at step S32) and ("Yes" at step S38), the control circuit 15 executes search mode control over the variable dispersion equalizer 11 (at steps S33 and S39). The control circuit 15 then does a high speed optimum value search with a variable width set large to thereby quickly acquire the optimal equalization value. In this example, the generation of the alarm information (errors uncorrectable) using the bit interleave parity of the client signal mapped on the frame has been explained. The algorithm can be similarly applied to the generation of the alarm information (the out-of-frame synchronism) and the alarm information (signal break).

In this manner, the variable dispersion equalizer 11 can be controlled stably, accurately. The control steps of controlling the variable dispersion equalizer 11 are explained. The variable dispersion equalizer 11 is controlled by making the step width variable using the following (1) to (3) modes.

(1) The step width is set large in a region in which there are many transmission errors and set small in a region in which there are not many transmission errors. When the step width is set in this manner, it is possible to control the variable dispersion equalizer 11 at faster conversion time.

(2) Conversely, the step width is set small in the region in which there are many transmission errors and set large in the region in which there are not many transmission errors. When the step width is set in this manner, it is possible to control the variable dispersion equalizer 11 so as to avoid the worst state as much as possible.

(3) If the dispersion on the transmission line suddenly and greatly fluctuates at the time of actuating the apparatus, a generally necessary amount of dispersion equalization is searched with a large step width in the dispersion equalization value search mode and then an optimal value is searched with a small step width.

If any other adjustment parameters that can be set automatically exist, then those parameters can be optimally controlled by optimizing the order of adjusting the respective parameters or an adjustment time constant. In addition, in an optical transmission system that includes various types of equalizers and has a plurality of adjustment parameters, it is possible to simultaneously control the respective equalizers and the adjustment parameters by unify management of control over the equalizers including the variable dispersion equalizer 11.

Figure 4:
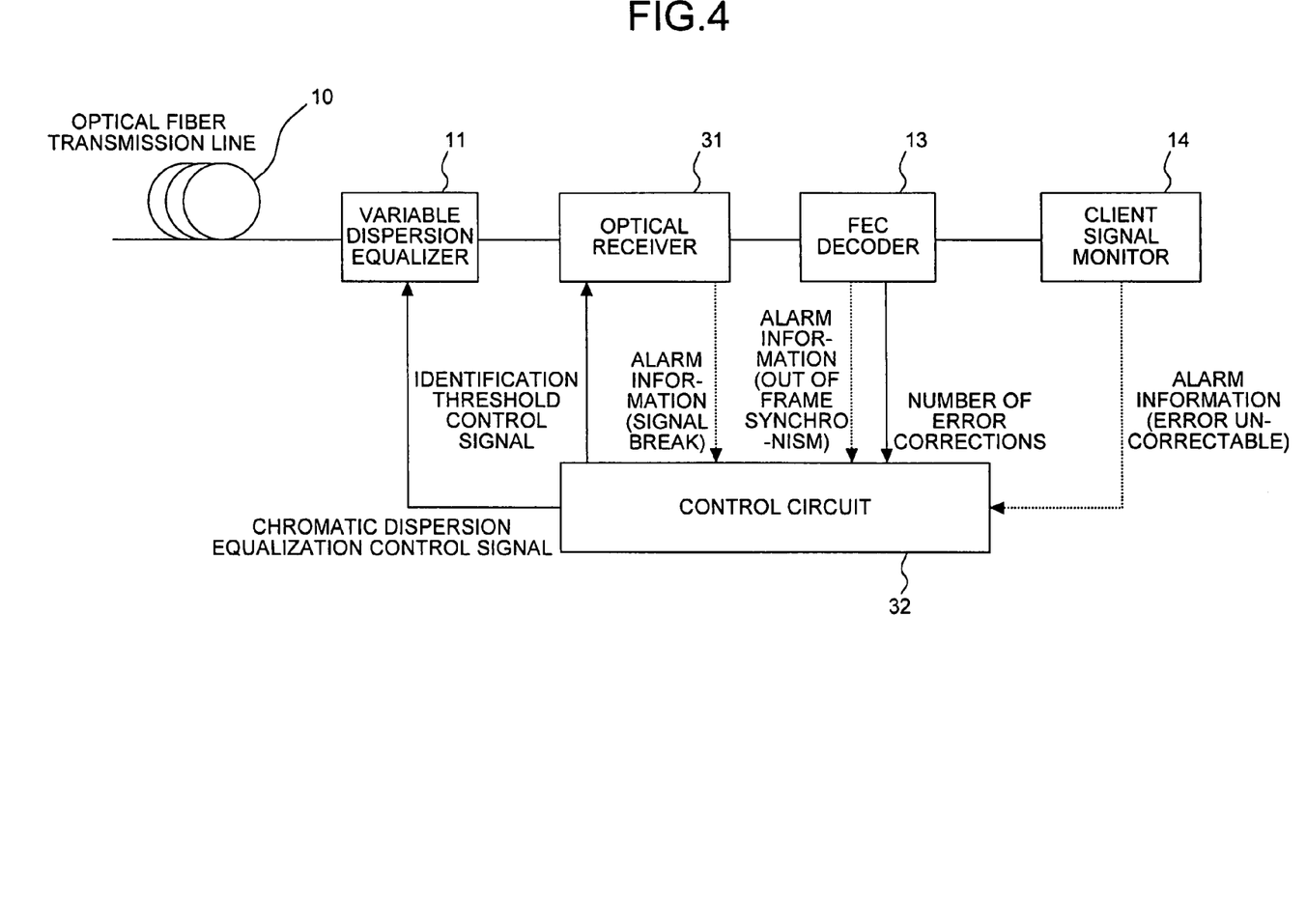
FIG. 4 is a block diagram of a dispersion equalizer according to a second embodiment of this invention.

FIG. 4 is a block diagram of a dispersion equalizer according to a second embodiment of this invention. In this figure, the same or equivalent constituent elements as those shown in FIG. 1 are denoted by the same reference symbols, respectively. This dispersion equalizer differs in configuration from that shown in FIG. 1 in that an optical receiver 31 is provided in place of the optical receiver 12 and a control circuit 32 is provided in place of the control circuit 15.

The control circuit 32 outputs a control signal (chromatic dispersion equalization control signal) to the variable dispersion equalizer 11 according to the number of error corrections and three pieces of alarm information acquired using the error-correction code similarly to the first embodiment. In addition, the control circuit 32 outputs an identification threshold control signal to the optical receiver 31. The optical receiver 31 adjusts an identification threshold in response to the identification threshold control signal from the control circuit 32 in addition to converting an optical signal into an electric signal and identifying and reproducing the electric signal. The other constituent elements function in the same manner as that explained in connection with the explanation of the first embodiment.

The operation of the dispersion equalizer in the second embodiment is explained. For instance, if chromatic dispersion on the optical fiber transmission line 10 gradually fluctuates due to the fluctuation of external temperature, a residual dispersion value constantly changes by the fluctuation of the dispersion on the optical fiber transmission line 10 and the adjustment of the variable dispersion equalization value. The waveform of an optical signal input to the optical receiver 31, therefore, constantly changes.

In this case, it is necessary to repeat a routine for initially optimally adjusting the identification threshold of the optical receiver 31 relative to a certain set dispersion equalization value, next checking the number of error corrections, and readjusting the dispersion equalization value based on the check result in order to determine whether the variable dispersion equalization value is set at an optimum value. That is, according to the method shown in FIG. 3, prior to the processing at each of steps S31 and S37, the identification threshold is always optimized. By thus initially adjusting the identification threshold, the variable dispersion equalizer 11 can accurately determine the set value and can, therefore, stably execute optimal automatic dispersion equalization.

Control procedures related to the two parameters, i.e., the identification threshold of the optical receiver 31 and the dispersion equalization value of the variable dispersion equalizer 11 are explained above. The same control procedures can be executed if there are other control parameters. That is, the identification threshold is optimally adjusted before changing the respective parameters and the control circuit 32 controls the variable dispersion equalizer 11 while correctly grasping the result of changing the corresponding parameters. As a result, it is possible to improve signal quality in the overall system.

Furthermore, if a plurality of parameters are simultaneously controlled, it is possible to improve the signal quality by controlling the identification threshold at the fastest time constant and controlling the other parameters at time constants slower than the time constant for the identification threshold. That is, the control speed for controlling the variable dispersion equalizer 11 may be set lower than that for controlling the identification threshold of the optical receiver 31.

Figure 5:
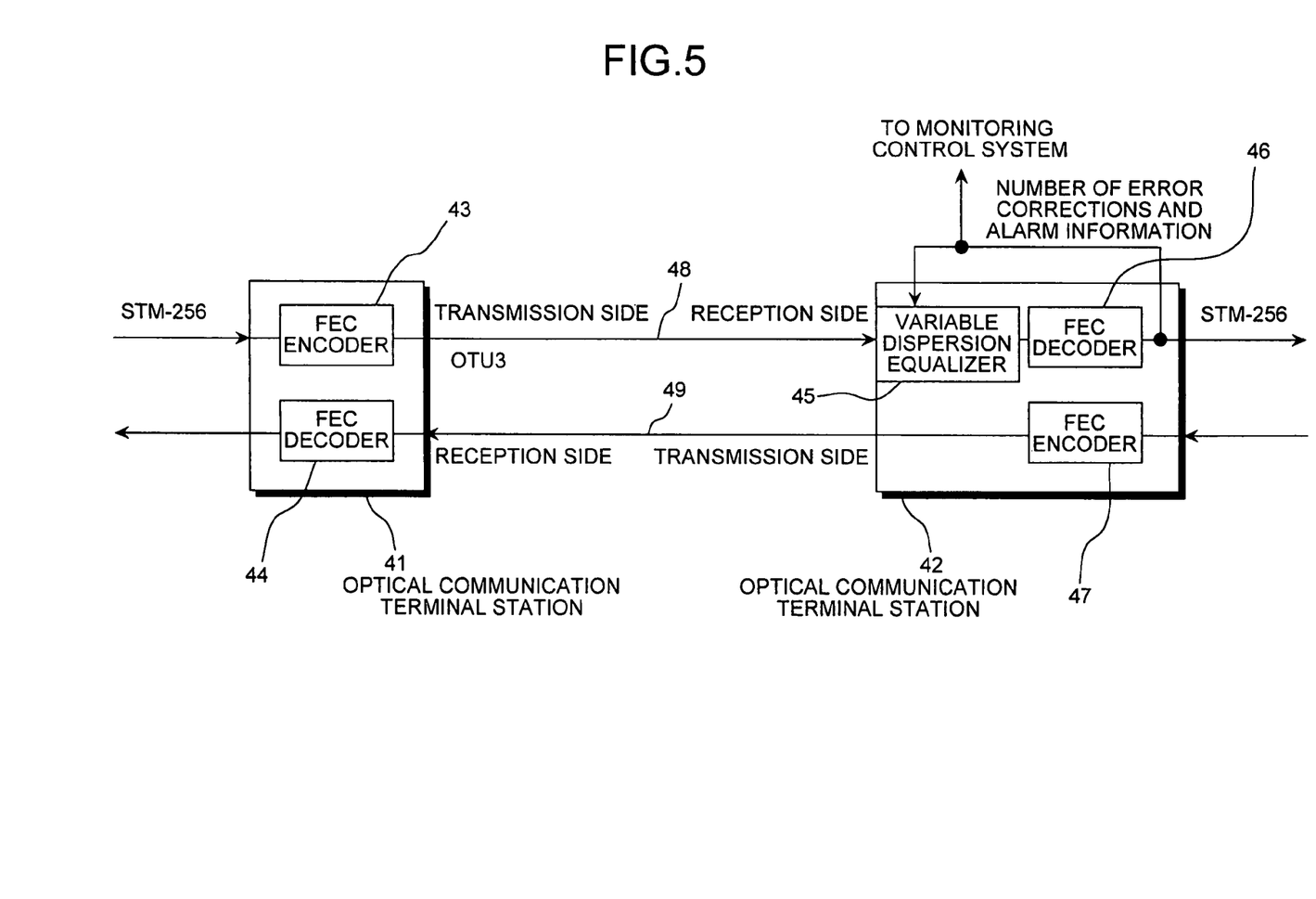
FIG. 5 is a block diagram of an optical transmission system including an optical communication terminal station that includes a dispersion equalizer according to a third embodiment of this invention.

FIG. 5 is a block diagram (1) of an optical transmission system that includes an optical communication terminal station in which a dispersion equalizer according to a third embodiment is installed. This third embodiment is an example of the configuration of an ultra high speed optical transmission system in which the dispersion equalizers of the first or the second embodiments is installed in any one of the two optical communication terminal stations or the regenerative repeaters.

In the optical transmission system of FIG. 5, optical communication terminal stations 41 and 42 exchange an STM (Synchronous Transfer Mode) signal (STM-256) with the outside. The optical communication terminal stations 41 and 42 exchange an OTU (Optical Transport Unit) signal (OTU3) therebetween. The dispersion equalizer of the first or the second embodiments is installed in the OUT signal reception side of each optical communication terminal station. For the convenience of explanation, FIG. 5 illustrates that the dispersion equalizer is installed in only the OTU signal reception side of the optical communication terminal station 42. It should be noted that the optical transmitter, the optical receiver, various electric processing circuits for converting the STM signal and the OTU signal, and the like are not shown in FIG. 5. Although a regenerative repeater (optical amplification repeater) is often arranged between the optical communication terminal stations 41 and 42, it is not shown in FIG. 5, either.

The optical communication terminal station 41 is generally constituted to include an FEC encoder 43 on the OTU signal transmission side and an FEC decoder 44 on the OTU signal reception side. On the other hand, the optical communication terminal station 42 includes an FEC encoder 47 on the OTU signal transmission side and an FEC decoder 46 on the OTU signal reception side.

Each of the FEC encoders 43 and 47 includes an FEC encoder and has an OTU signal frame generation function indicated by ITU-TG709 recommendation. Each of the FEC decoders 44 and 46 has a function of decomposing and decoding an OTU frame signal and detecting and correcting an FEC error.

In the optical communication terminal station 42, although not shown, the client signal monitor 14 explained in connection with the first and the second embodiments is provided. Moreover, a variable dispersion equalizer 45 in the optical communication terminal station 42 includes one of the control circuits 15 and 32 explained explained in connection with the first and the second embodiments. The optical communication terminal station 42 inputs the number of error corrections and alarm information from the FEC decoder 46. The number of error corrections and the alarm information are also output to an external monitoring control system. That is, the external monitoring control system can unify manage information (the number of error corrections and the alarm information) on control over the variable dispersion equalizer 45 as well as the other control parameters.

The optical transmission system of FIG. 5 operates as follows. An operation for equalizing chromatic dispersion on an optical fiber transmission line 48 from the optical communication terminal station 41 to the optical communication terminal station 42 will be explained. In the optical communication terminal station 41 which receives the STM-256 signal from the outside, a not shown processing circuit converts the STM-256 signal into an OTU3 signal, the FEC encoder 43 generates an FEC code using, for example, a Reed-Solomon code (255, 239), and the generated FEC code is mapped on the frame of the OTU3 signal and the OUT3 signal is then transmitted to the optical fiber transmission line 48.

In the optical communication terminal station 42, a not show optical receiver receives the OTU3 signal from the optical fiber transmission line 48 via the variable dispersion equalizer 45. The OTU3 signal is converted into an electric signal and identified and reproduced, and the resultant signal is input to the FEC decoder 46. During the conversion of the OTU3 signal into the STM-256 signal, the FEC decoder 46 decodes the FEC code and, at the same time, corrects errors and counts the number of corrected errors.

The number of error corrections and various pieces of alarm information that are detected by the FEC decoder 46 are aggregated by the monitoring control system and also used for controlling the variable dispersion equalizer 45. As a result, the variable dispersion equalizer 45 carries out optimal dispersion equalization according to the procedures shown in FIG. 3, thus accurately equalizing the chromatic dispersion on the optical fiber transmission line 48. The FEC decoder 46 can thereby convert the OTU3 signal into the STM-256 signal with fewer errors and output the STM-256 signal to the outside.

Likewise, as for an optical fiber transmission line 49 that is a transmission path from the optical communication terminal station 42 toward the optical communication terminal station 41, chromatic dispersion on the optical fiber transmission line 49 can be accurately equalized by installing the dispersion equalizer to the OTU signal reception side of the optical communication terminal station 41.

Since the dispersion equalizer is simple in configuration, it can be easily installed to a regenerative repeater. Further, even if the optical communication terminal station is a line branch apparatus corresponding to a plurality of lines, the dispersion equalizer can be easily installed for each line.

Figure 6:
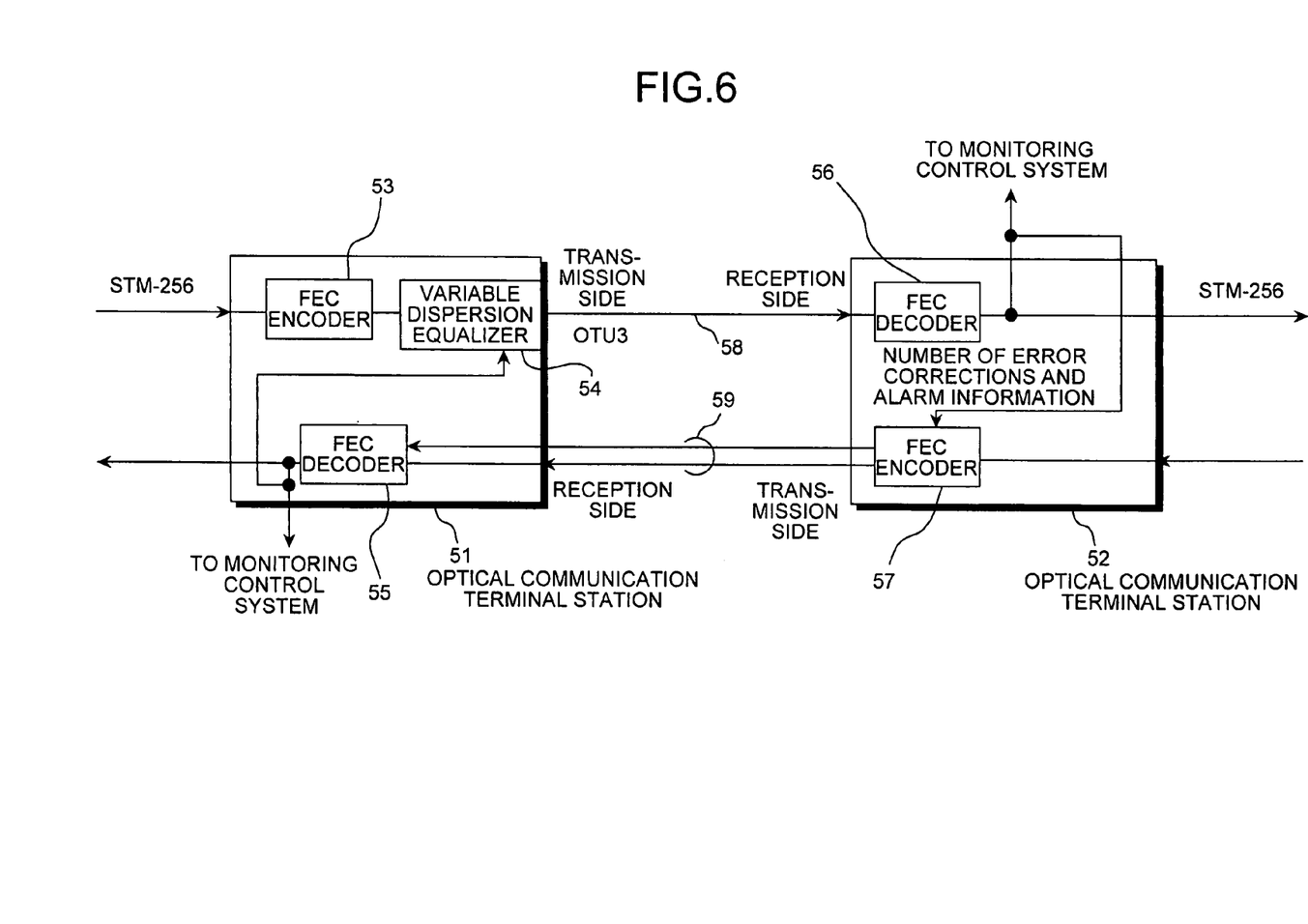
FIG. 6 is a block diagram of an optical transmission system including an optical communication terminal station that includes a dispersion equalizer according to a fourth embodiment of this invention.

FIG. 6 is a block diagram (2) of an optical transmission system that includes an optical communication terminal station to which a dispersion equalizer as the fourth embodiment of this invention is installed. This fourth embodiment is an example of the configuration of an ultra high speed optical transmission system as follows. The dispersion equalizer shown in FIG. 1 or 4 is divided into two parts, i.e., a variable dispersion equalizer that includes a control circuit and a constituent section which generates the number of error corrections and alarm information. As for two apparatuses opposed each other and each of that includes a regenerative repeater, the variable dispersion equalizer that includes the control circuit is arranged in the transmission side apparatus, the constituent section which generates the number of error corrections and the alarm information is arranged in the reception side apparatus, and the number of error corrections and the alarm information are transmitted from the reception side apparatus to the transmission side apparatus.

In this optical transmission system, optical communication terminal stations 51 and 52 exchange the STM signal (STM-256) with the outside of the system and exchange the OTU signal (OTU3) therebetween similarly to the third embodiment. It is noted that FIG. 6 does not show the optical transmitter, the optical receiver, various electric processing circuits for converting the STM signal and the OTU signal, and the like. Further, although a regenerative repeater (optical amplification repeater) is often arranged between the optical communication terminal stations 41 and 42, it is not shown in FIG. 6, either.

FIG. 6 illustrates the system for equalizing chromatic dispersion on an optical fiber transmission line 58 from the optical communication terminal station 51 to the optical communication terminal station 52. Since the configuration for equalizing chromatic dispersion on an optical fiber transmission line 59 from the optical communication terminal station 52 to the optical communication terminal station 51 is the same as the former configuration, it will not be shown in FIG. 6.

The optical communication terminal station 51 includes a variable dispersion equalizer 54 that is one constituent element of the dispersion equalizer as well as an FEC encoder 53 on the OTU signal transmission side, and an FEC decoder 55 on the OTU signal reception side. On the other hand, the optical communication terminal station 52 includes an FEC encoder 57 on the OTU signal transmission side and an FEC decoder 56 that is one constituent element of the dispersion equalizer on the OTU signal reception side.

The FEC decoder 56 in the optical communication terminal station 52 outputs the number of error corrections and the alarm information thus detected to the FEC encoder 57 and also outputs them to an external monitoring control system.

In converting the STM-256 signal input from the outside into the OTU3 signal and transmitting the OTU3 signal to the optical fiber transmission line 59, the FEC encoder 57 inserts the number of error corrections and the alarm information output from the FEC decoder 56 into the overhead of an error-correction code of an OTU frame. To be specific, an allocated byte for the communication between network elements in the overhead of the error-correction code is employed. Alternatively, a control line in the overhead of the error-correction code may be employed.

In converting the OTU3 signal fetched from the optical fiber transmission line 59 into the STM-259 signal, the FEC decoder 55 in the optical communication terminal station 51 extracts the number of error corrections and the alarm information from the OTU3 signal and supplies the number of error corrections and the alarm information thus extracted to the variable dispersion equalizer 54. The FEC decoder 55 also outputs the number of error corrections and the alarm information thus extracted to the external monitoring control system.

This optical transmission system operates as explained below. An operation for equalizing chromatic dispersion on the optical fiber transmission line 59 from the optical communication terminal station 51 to the optical communication terminal station 52 is explained. In the optical communication terminal station 51 which receives the STM-256 signal from the outside, a processing circuit included therein converts the STM-256 signal into the OTU3 signal, the FEC encoder 53 generates an FEC code using, for example, a Reed-Solomon code (255, 239), maps the FEC code on the frame of the OTU3 signal, converts the resultant OTU3 signal into an optical signal, and transmits the optical signal to the optical fiber transmission line 58 via the variable dispersion equalizer 54.

In the optical communication terminal station 52 which inputs the OTU3 signal from the optical fiber transmission line 58, the optical receiver, not shown, converts the OTU3 signal into an electric signal, identify and reproduce the electric signal, and inputs the electric signal to the FEC decoder 56. During the conversion of the OTU3 signal into the STM-256 signal, the FEC decoder 56 decodes the FEC code and, at the same time, corrects errors and counts the number of corrected errors.

The number of error corrections and the alarm information detected by the FEC decoder 56 are aggravated by the monitoring control system and input to the FEC encoder 57. In converting the STM-256 signal input from the outside into the OTU3 signal and transmitting the OTU3 signal to the optical fiber transmission line 59, the FEC encoder 57 inserts the number of error corrections and the alarm information output from the FEC decoder 56 into the OUT frame in the same manner as that explained above. The OTU3 signal that includes the number of error corrections and the alarm information is converted into an optical signal by the optical transmitter, not shown, and the optical signal is transmitted to the optical fiber transmission line 59 and input to the optical communication terminal station 51.

In the optical communication terminal station 51, in converting the OTU3 signal fetched from the optical fiber transmission line 59 into the STM-256 signal, the FEC decoder 55 extracts the number of error corrections and the alarm information from the OTU3 signal and supplies the number of error corrections and the alarm information to the variable dispersion equalizer 54. As a result, the variable dispersion equalizer 54 carries out optimal dispersion equalization according to the procedures shown in FIG. 3, thus accurately equalizing the chromatic dispersion on the optical fiber transmission line 58. The optical communication terminal station 52 is thereby subjected to a pre-dispersion compensation so that transmission quality on the optical fiber transmission line 58 becomes optimal. The FEC decoder 56 can, therefore, convert the OTU3 signal into the STM-256 signal with fewer errors and output the STM-256 signal to the outside.

Likewise, the equalization of chromatic dispersion on the optical fiber transmission line 59 from the optical communication terminal station 52 to the optical communication terminal station 51 can be realized by arranging the constituent element which generates the number of error corrections and alarm information in the optical communication terminal station 51, arranging the variable dispersion equalizer including the control circuit in the optical communication terminal station 52, and transmitting the number of error corrections and the alarm information from the optical communication terminal station 51 to the optical communication terminal station 52. Since the configuration is simple, it is possible to easily install the dispersion equalizer even to a regenerative repeater. Further, even if the optical communication terminal station is a line branch apparatus corresponding to a plurality of lines, the dispersion equalizer can be easily installed for each line.

As mentioned in connection with the third and fourth embodiments, it is possible to construct the ultra high speed optical transmission system that includes the dispersion equalizer that is easy to install and control and which can employ the highly accurate, highly versatile control method.

The first to fourth embodiments have been explained while assuming that the variable dispersion equalizer is an equalizer that equalizes chromatic dispersion on the optical fiber transmission line. However, the other equalizer, e.g., an equalizer that equalizes polarization mode dispersion on the optical fiber transmission line can be also employed.

In the third and fourth embodiments, the instance of using the Reed-Solomon code (255, 239) as the FEC code has been explained. However, a BCH (Bose-Chaudhuri-Hocquenghem) code or an error-correction code having a stronger error correction function by combining the Reed-Solomon code with the BCH code can be also employed.

As explained so far, according to the present invention, the variable dispersion equalization unit is provided in before the error detection unit and the alarm detection unit. The error detection unit detects transmission error information on the optical signal transmitted on the optical fiber transmission line and coded by the error-correction code. The alarm detection unit detects alarm information on the transmission of the optical signal. The control unit generates the control signal for the variable dispersion equalization using the transmission error information obtained by the error detection unit and the alarm information obtained by the alarm detection unit. As a result, the variable dispersion equalization unit adjusts the parameter for restricting the transmission length of the optical fiber transmission line based on the control signal from the control unit. Therefore, the dispersion equalizer which can be easily installed in an optical communication terminal station or a regenerative repeater and which can accurately adjust the parameter for restricting the transmission length of the optical fiber transmission line by a highly versatile and simple control method is attained.

Moreover, in the optical communication terminal station to which the dispersion equalizer according to the above invention is installed, the monitoring control unit that unify manages a plurality of automatic adjustment items including the transmission error information and the alarm information. Therefore, it is possible to control the variable dispersion equalization unit more optimally.

Furthermore, the control unit first optimally adjusts the identification threshold of an optical receiver using the transmission error information obtained by the error detection unit and the alarm information obtained by the alarm detection unit, and then controls the variable dispersion equalization unit. Therefore, the variable dispersion equalization unit can correctly determine a set value, so that it is possible to stably carry out optimal dispersion equalization.

Moreover, the control unit adjusts the identification threshold of the optical receiver at a higher speed than a control speed for controlling the variable dispersion equalization unit. Therefore, it is possible to improve signal quality.

According to next invention, the dispersion equalizer comprises the transmitter transmitting an optical signal to an optical fiber transmission line and the receiver receiving the optical signal from the optical fiber transmission line. That is, in the receiver, the transmission error information on the optical signal coded by an error-correction code and transmitted on the optical fiber transmission line, which information is detected by the error detection unit and the alarm information on transmission of the optical signal, which information is detected by the alarm detection unit are transmitted by the transmission unit to the transmitter. In the transmitter, the information extraction unit extracts the transmission error information and the alarm information from the optical signal transmitted from the receiver to the optical fiber transmission line, and the control unit generates the control signal for the variable dispersion equalization unit using the extracted transmission error information and the extracted alarm information. As a result, the variable dispersion equalization unit adjusts the parameter for restricting the transmission length of the optical fiber transmission line that is the transmission line to the receiver based on the control signal from the control unit. Therefore, the transmitter can make a pre-dispersion compensation so that the quality of the signal transmitted to the receiver becomes optimal.

Moreover, if the alarm information is not input to the control unit, the control unit controls the variable equalization unit such that a transmission error becomes smaller using the transmission error information. At this time, the dispersion equalization value is fixed when the error becomes equal to or lower than the specified value. If the alarm information is input to the control unit, the control unit switches control over the variable equalization unit from ordinary control to search mode control for searching an optimal dispersion equalization value in a wide range to thereby search the optimal dispersion equalization value at a higher speed. It is thereby possible to swiftly obtain an optimal dispersion equalization value and ensure stable control when the apparatus is actuated or the state of the transmission line suddenly, greatly fluctuates.

Furthermore, the error detection unit detects the number of error corrections by the error-correction code as the transmission error information. Therefore, it is possible to conduct highly versatile, accurate control.

Moreover, the alarm detection unit detects signal break at the optical receiver as the alarm information. Therefore, it is possible to conduct highly stable control.

Furthermore, the alarm detection unit detects an out of synchronism coded by the error-correction code as the alarm information. Therefore, it is possible to conduct highly stable control.

Moreover, the alarm detection unit detects the number of errors existing after error corrections using the error-correction code as the alarm information. Therefore, it is possible to conduct highly stable control.

Furthermore, the alarm detection unit detects the number of errors existing after the error corrections using the error-correction code, using bit interleave parity of a client signal mapped on an error-correction coded frame. Therefore, it is possible to conduct highly stable control.

Moreover, if the receiver is part of the optical communication terminal station, the receiver is provided with a monitoring control unit that unify manages a plurality of automatic adjustment items including the transmission error information and the alarm information. Therefore, it is possible to control the variable dispersion equalizer more optimally.

Furthermore, the transmission unit transmits the transmission error information and the alarm information by inserting the transmission error information and the alarm information into an overhead of the error-correction code. Therefore, it is possible to transmit the transmission error information and the alarm information with a simple constitution.

Moreover, the transmission unit transmits the transmission error information and the alarm information by using an allocated byte for communication between network elements in the overhead of the error-correction code. Therefore, it is possible to transmit the transmission error information and the alarm information with a simple constitution.

Furthermore, the transmission unit transmits the transmission error information and the alarm information by using a control line in the overhead of the error-correction code. Therefore, it is possible to transmit the transmission error information and the alarm information with a simple constitution.

Moreover, the parameter adjusted by the variable dispersion equalization unit includes chromatic dispersion or polarization mode dispersion. Therefore, it is possible to realize equalization of at least one of the chromatic dispersion and polarization mode dispersion on the optical fiber transmission line under optimal control.

Furthermore, the error-correction code includes a Reed-Solomon code or a BCH code. Therefore, it is possible to further improve versatility.

According to next invention, if the optical signal coded by the error-correction code is input from the optical fiber transmission line at the input step, the chromatic dispersion of the input optical signal is equalized based on the parameter for equalizing the chromatic dispersion of the optical signal at the equalization step, and the transmission error information on the optical signal the chromatic dispersion of which is equalized and the alarm information on the transmission of the optical signal are detected at the detection step. As a result, the control signal is generated based on the detected transmission error information and the detected alarm information at the generation step, and the parameter is adjusted based on the generated control signal at the adjustment step. In this way, the dispersion equalization method which can be easily carried out in the optical communication terminal station or the regenerative repeater and which can accurately adjust the parameter for restricting the transmission length of the optical fiber transmission line by a highly versatile and simple control method is attained.

A dispersion equalization method according to the next invention includes an optical signal reception step of receiving an optical signal transmitted on an optical fiber transmission line; and an optical signal transmission step of equalizing chromatic dispersion of the optical signal based on the received optical signal and transmitting to the fiber transmission line is provided. That is, at the optical signal reception step, if the optical signal coded by an error-correction code is received from the optical fiber transmission line at the reception step, transmission error information on the received optical signal is detected at the first detection step and alarm information on the transmission of the received optical signal is detected at the second detection step. At the optical signal transmission step, a control signal is generated based on the transmission error information and the alarm information detected at the optical signal reception step at the generation step, and a parameter for equalizing the chromatic dispersion of the optical signal accompanying the transmission of the optical signal on the optical fiber transmission line is adjusted based on the generated control signal and the transmitted optical signal is equalized based on the adjusted parameter at the equalization step. The optical signal, the chromatic dispersion of which is equalized at the equalization step, is transmitted to the optical fiber transmission line at the transmission step. Therefore, the transmission side can make a pre-dispersion compensation so that the quality of the signal transmitted to the reception side becomes optimal.

INDUSTRIAL APPLICABILITY

As explained above, the dispersion equalizer and the dispersion equalization method according to this invention are effective for an ultra high speed optical transmission system required to accurately adjust chromatic dispersion on the optical transmission line by a highly versatile, simple control method, and particularly suited for an optical transmission terminal station or a regenerative repeater in the ultra high speed optical transmission system.

The invention claimed is:

1. A dispersion equalizer comprising:
an error detection unit that detects a transmission error of an optical signal, wherein the optical signal is coded based on an error-correction code and transmitted on an optical fiber transmission line;
an alarm detection unit that detects alarm information on transmission of the optical signal;
a variable dispersion equalization unit provided at an earlier stage with respect to the error detection unit and the alarm detection unit, wherein variable dispersion equalization unit adjusts a parameter for restricting a transmission length of the optical fiber transmission line based on a control signal; and
a control unit that generates the control signal based on the transmission error information obtained from the error detection unit and the alarm information obtained from the alarm detection unit, wherein
if the control unit does not receive the alarm information, the control unit controls the variable equalization unit such that the transmission error becomes smaller, and
if the control unit receives the alarm information, the control unit switches control over the variable equalization unit from an ordinary control to a search mode control for searching an optimal dispersion equalization value in a wide range to thereby search the optimal dispersion equalization value at a higher speed.

2. The dispersion equalizer according to claim 1, wherein upon the dispersion equalizer being provided in an optical communication terminal station in an optical transmission system, further comprises a monitoring control unit that unify manages a plurality of automatic adjustment items including the transmission error information and the alarm information.

3. The dispersion equalizer according to claim 1, further comprising an optical receiver that is connected with the variable dispersion equalization unit and the error detection unit, wherein
the control unit first adjusts an identification threshold of the optical receiver so as to be optimal using the transmission error information obtained from the error detection unit and the alarm information obtained from the alarm detection unit, and then controls the variable dispersion equalization unit.

4. The dispersion equalizer according to claim 3, wherein
the control unit adjusts the identification threshold of the optical receiver at a speed that is higher than a control speed for controlling the variable dispersion equalization unit.

5. The dispersion equalizer according to claim 1, wherein
the error detection unit detects number of error corrections by the error-correction code as the transmission error information.

6. The dispersion equalizer according to claim 1, further comprising an optical receiver that is connected with the variable dispersion equalization unit and the error detection unit, wherein
the alarm detection unit detects signal break at the optical receiver as the alarm information.

7. The dispersion equalizer according to claim 1, wherein
the alarm detection unit detects an out of synchronism coded by the error-correction code as the alarm information.

8. The dispersion equalizer according to claim 1, wherein
the alarm detection unit detects number of errors existing after error corrections using the error-correction code as the alarm information.

9. The dispersion equalizer according to claim 1, wherein
the parameter adjusted by the variable dispersion equalization unit is at least one of chromatic dispersion and polarization mode dispersion.

10. The dispersion equalizer according to claim 1, wherein
the error-correction code is one of a Reed-Solomon code and a Bose-Chaudhuri-Hocqueneghem code.

11. A dispersion equalizer comprising:
a transmitter that transmits an optical signal to an optical fiber transmission line; and a receiver that receives the optical signal from the optical fiber transmission line, wherein
the receiver includes
an error detection unit that detects a transmission error of the optical signal, wherein the optical signal is coded based on an error-correction code and transmitted on an optical fiber transmission line;
an alarm detection unit that detects alarm information on transmission of the optical signal; and
a transmission unit that transmits the detected transmission error information and the detected alarm information to the transmitter, and
the transmitter includes
a variable dispersion equalization unit that adjusts a parameter for restricting a transmission length of the optical fiber transmission line based on a control signal;

an information extraction unit that extracts the transmission error information and the alarm information from the optical signal transmitted to the optical fiber transmission line; and a control unit that generates the control signal using the extracted transmission error information and the extracted alarm information, wherein if the control unit does not receive the alarm information, the control unit controls the variable equalization unit such that the transmission error becomes smaller, and if the control unit receives the alarm information, the control unit switches control over the variable equalization unit from an ordinary control to a search mode control for searching an optimal dispersion equalization value in a wide range to thereby search the optimal dispersion equalization value at a higher speed.

12. The dispersion equalizer according to claim 11, wherein the error detection unit detects number of error corrections by the error-correction code as the transmission error information.

13. The dispersion equalizer according to claim 11, further comprising an optical receiver that is connected with the variable dispersion equalization unit and the error detection unit, wherein the alarm detection unit detects signal break at the optical receiver as the alarm information.

14. The dispersion equalizer according to claim 11, wherein the alarm detection unit detects an out of synchronism coded by the error-correction code as the alarm information.

15. The dispersion equalizer according to claim 11, wherein the alarm detection unit detects number of errors existing after error corrections using the error-correction code as the alarm information.

16. The dispersion equalizer according to claim 15, wherein the alarm detection unit detects number of errors existing after the error corrections using the error-correction code, using bit interleave parity of a client signal mapped on an error-correction coded frame.

17. The dispersion equalizer according to claim 11, wherein the receiver comprises a monitoring control unit that unify manages a plurality of adjustment items including the transmission error information and the alarm information.

18. The dispersion equalizer according to claim 17, wherein the transmission unit transmits the transmission error information and the alarm information by inserting the transmission error information and the alarm information into an overhead of the error-correction code.

19. The dispersion equalizer according to claim 18, wherein the transmission unit transmits the transmission error information and the alarm information by using an allocated byte for communication between network elements in the overhead of the error-correction code.

20. The dispersion equalizer according to claim 18, wherein the transmission unit transmits the transmission error information and the alarm information by using a control line in the overhead of the error-correction code.

21. The dispersion equalizer according to claim 11, wherein the parameter adjusted by the variable dispersion equalization unit is at least one of chromatic dispersion and polarization mode dispersion.

22. The dispersion equalizer according to claim 11, wherein the error-correction code is one of a Reed-Solomon code and a Bose-Chaudhuri-Hocqueneghem code.

23. A dispersion equalization method comprising:

receiving an optical signal, wherein the optical signal is coded based on an error-correction code and transmitted on an optical fiber transmission line;

utilizing a variable equalization unit for equalizing chromatic dispersion of the optical signal based on a parameter for equalizing the chromatic dispersion of the optical signal;

detecting transmission error information on the chromatic dispersion equalized optical signal and detecting alarm information on transmission of the optical signal;

generating a control signal based on the transmission error information and the alarm information; and adjusting the parameter based on the control signal, wherein if the alarm information is not received, controlling the variable equalization unit such that the transmission error becomes smaller, and if the alarm information is received, switching control over the variable equalization unit from an ordinary control to a search mode control for searching an optimal dispersion equalization value in a wide range for searching the optimal dispersion equalization value at a higher speed.

24. A dispersion equalization method comprising:

receiving an optical signal transmitted on an optical fiber transmission line; utilizing a variable utilization unit for equalizing chromatic dispersion of the optical signal based on the received optical signal; and transmitting the chromatic dispersion equalized optical signal to the optical fiber transmission line, wherein the receiving the optical signal includes
receiving the optical signal coded by an error-correction code via the optical fiber transmission line;
detecting transmission error information on the optical signal; and
detecting alarm information on transmission of the optical signal, and wherein the equalizing includes
generating a control signal based on the transmission error information and the alarm information;
adjusting a parameter for equalizing the chromatic dispersion of the optical signal accompanying transmission of the optical signal on the optical fiber transmission line based on the control signal, and equalizing the transmitted optical signal based on the parameter, wherein if the alarm information is not received, controlling the variable equalization unit such that the transmission error becomes smaller, and if the alarm information is received, switching control over the variable equalization unit from an ordinary control to a search mode control for searching an optimal dispersion equalization value in a wide range for searching the optimal dispersion equalization value at a higher speed.

* * * * *